(12) United States Patent
McKeown

(10) Patent No.: US 6,325,331 B1
(45) Date of Patent: Dec. 4, 2001

(54) TRIM ACTUATOR

(75) Inventor: William L. McKeown, Euless, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 0 days.

(21) Appl. No.: 09/457,821

(22) Filed: Dec. 9, 1999

Related U.S. Application Data

(60) Provisional application No. 60/111,819, filed on Dec. 11, 1998.

(51) Int. Cl.[7] .......................... B64C 13/16; B64C 17/00; B64C 3/18; B64C 13/04; B64C 13/14
(52) U.S. Cl. .................. 244/76 A; 244/221; 244/220; 244/224
(58) Field of Search .................. 170/135.72; 310/162, 310/89; 318/254, 562; 244/76 A, 221, 224, 220

(56) References Cited

U.S. PATENT DOCUMENTS

| | | | |
|---|---|---|---|
| 2,479,549 | 8/1949 | Ayres et al. | 24417/13 |
| 2,985,243 | * 5/1961 | Tyler et al. | 170/135.72 |
| 4,004,537 | 1/1977 | Nilsson | 114/144 |
| 4,644,234 | * 2/1987 | Nola | 318/254 |
| 4,970,423 | * 11/1990 | Tamae et al. | 310/162 |
| 5,233,252 | 8/1993 | Denk | 310/254 |
| 5,445,346 | * 8/1995 | Gilbert | 244/221 |
| 5,600,220 | * 2/1997 | Thoraval et al. | 318/562 |
| 5,684,350 | * 11/1997 | Hara et al. | 310/89 |

FOREIGN PATENT DOCUMENTS

2135796A  *  9/1984  (GB) .

* cited by examiner

*Primary Examiner*—Charles T. Jordan
*Assistant Examiner*—Christian M. Best
(74) *Attorney, Agent, or Firm*—Melvin A. Hunn; James E. Walton; Hill & Hunn LLP

(57) ABSTRACT

A trim actuator for actuating mechanical controls in an aircraft flight control system in response to signals from a pilot having a stepper motor, a gear train member coupled to the stepper motor, an output member coupled to the gear train member. The trim actuator has a locked mode in which the mechanical controls are held in a fixed position relative to the aircraft, and a non-interference mode in which the mechanical controls are free to be moved by the pilot without interference from the aircraft flight control system. The non-interference mode and the locked mode are both achieved by the stepper motor.

14 Claims, 3 Drawing Sheets

TRIM ACTUATOR

CROSS REFERENCE TO RELATED APPLICATION

This application claims the benefit of U.S. Provisional Application Ser. No. 60/111,819, filed Dec. 11, 1998, entitled "Trim Actuator."

BACKGROUND OF THE INVENTION

1. Field of the Invention

The present invention relates to control actuators, and in particular, to trim actuators for use in aircraft flight control systems, such as helicopter flight control systems.

2. Background of the Prior Art

Automated steering mechanisms and flight control systems for aircraft have been around for many years. An early automatic pilot for helicopters is disclosed in U.S. Pat. No. 2,479,549 issued Aug. 23, 1949 to Ayres et al. The Ayres electrical control system can be overridden so that the aircraft can be operated manually. In Ayres, an aneroid bellows controls an electric motor for adjusting and maintaining altitude, a directional gyro controls an electric motor for adjusting and maintaining heading, and an attitude gyro controls two electric motors for adjusting and maintaining attitude.

A steering mechanism utilizing a servo motor is disclosed U.S. Pat. No. 4,004,537 issued Jan. 25, 1977 to Nilsson. The Nilsson steering mechanism is designed primarily for boats. In Nilsson, rotation of a wheel is passed through a cable to a ball screw cylinder, where the rotation is transformed into linear movement of bar. The rotatable element in the ball screw cylinder is connected to a servo motor, via gears and a transmission. When the cable rotates faster than the servo motor, the transmission decouples the motor and allows the wheel and cable to override the servo motor. The transmission in Nilsson may be a double-acting free-wheeling clutch.

A motor for use in an aircraft flight control system is disclosed in U.S. Pat. No. 5,233,252 issued Aug. 3, 1993 to Denk. Denk contemplates using a two-pole permanent-magnet rotor and a toothless stator motor. A pair of these motors are incorporated into a flight control system replacing hydraulic or electric motors and potentially eliminating the need for an additional friction brake. The motors have a detent, or holding, mode, wherein they act as brakes, resisting back-driving forces acting on the flaps. In Denk, flux gates are inserted by a solenoid and its plunger into a space between the stator core elements. When the motor is not in use, the plunger is retracted by springs, and the flux gates are removed from the spaces. The permanent-magnet rotor simultaneously rotates to align its magnetic axis with the spaces. Once in this preferred orientation, the permanent-magnet rotor resists imposed torque loads. This is the preferred mode, i.e. holding, for the application to which the Denk patent is directed. The need for a solenoid, spring or other mechanism to activate/de-activate the function is an undesirable complication.

With respect to helicopter flight control systems, the prior art trim actuator devices typically include an electrically-actuable motor, a gear assembly, a brake device for locking the position of the rotor of the electrically-actuable motor, a clutch for mechanically controlling the interaction of the electrically-actuable motor and the gear assembly. Additionally, in the prior art devices, an eddy-current damping system is sometimes provided with a permanent magnet member carried by the rotor of the electrically-actuable motor. When a stepper motor is utilized for the electrically-actuable motor, the brake component can be eliminated; however, prior art devices all require some type of clutch to interface mechanically the electrically actuable motor and the gear assembly.

SUMMARY OF THE INVENTION

The present invention is an improved trim actuator for use in flight control systems, with the preferred embodiment being utilized in flight control systems for helicopters. In accordance with the present invention, the trim actuator interfaces with an automatic flight control system to partially or completely control the mechanical flight controls of air craft. When the aircraft is operating in an entirely automated flight control mode of operation, the automatic flight control system utilizes a controller to execute program instructions to operate the mechanical flight controls by applying electrical current to the electrically-actuable motor which is a part of the trim actuator. In accordance with the present invention, an electrically actuable stepper motor is utilized as part of the trim actuator. The stepper motor includes stator components and a rotor. The automatic flight control system supplies electrical currents to the plurality of windings which make up the stepper motor, controlling the movement of the rotor of the stepper motor. In accordance with the preferred embodiment of the present invention, the use of an electrically-actuable stepper motor eliminates the need for providing a mechanical brake to lock the rotor into a particular position. In accordance with the present invention, supplying currents to the plurality of windings of the stepper motor can lock the rotor into any particular position. Therefore, the brake assembly which is necessary in the prior art devices is eliminated entirely in the present invention. This eliminates a mechanical component which is subject to failure possibly, which requires servicing certainly, and which adds undesirable weight to the aircraft. Therefore, one objective and advantage of the present invention is to eliminate entirely from the trim actuator any mechanical braking device.

Sometimes it is desirable to operate the aircraft in a partially automated mode of operation. In this mode of operation, the controller of the automatic flight control system executes program instructions in response to operator commands and sensor date to control some components of the flight control system, while the pilot manually controls other components of the flight control system. This is a more complex mode of operation, which is conventional in all helicopter craft, which requires that the automatic flight control system operate through the electrically-actuable stepper motor of the trim actuator of the present invention to partially control some components of the mechanical flight controls. For example, a plurality of trim actuators may be utilized in the pitch, roll, and yaw axis for forced trim reference functions. One of more of these force axes may be under computer control, while others are under manual control. Alternatively, the craft may be under a combination of automated and manual control. In still other situations, it may be desirable for the pilot to suspend or terminate all automated flight control, and fly the craft entirely manually utilizing the mechanical flight controls. In these situations, the present invention allows the electrically-actuable stepper motor to free-wheel completely, without any mechanical or electrical interference with the complete manual control of the craft by the pilot. However, in accordance with the present invention, an electrically-actuable, non-contact damping system is provided which facilitates the transition between an automated flight control mode of operation to a completely manual control mode of operation. In accordance with the preferred embodiment of the present invention, an eddy current braking system is provided which does not physically contact the rotor of the electrically-actuable stepper motor, but which dampens the rotor utilizing magnetic fields and eddy currents. The present invention departs from the prior art in the preferred embodiment insofar as it does not provide permanent magnet components in the damping system, thus providing damping of vibration and instabilities during the transition between modes of operation, without any impact whatsoever on the rotor of the electrically-actuable stepper motor when it is free-wheeling during a entirely manually mode of operation. In other words, the preferred embodiment of the present invention provides a non-contact damping system for very brief intervals associated with the transition in control, but otherwise does not impact the mechanical flight controls during manual flight operations. In alternative embodiments, the electrically-actuable damping system may be utilized to provide a predetermined amount of damping to the mechanical flight control system. This is preferable to trim actuators which utilize permanent magnets as part of an eddy current damping system since the amount of damping provided during manual flight operations is not set by a physical component, but is instead established by a controller which may provide the operator with a preselected amount of damping over a range of damping, or no damping whatsoever.

DETAILED DESCRIPTION OF THE INVENTION

Figure 1:
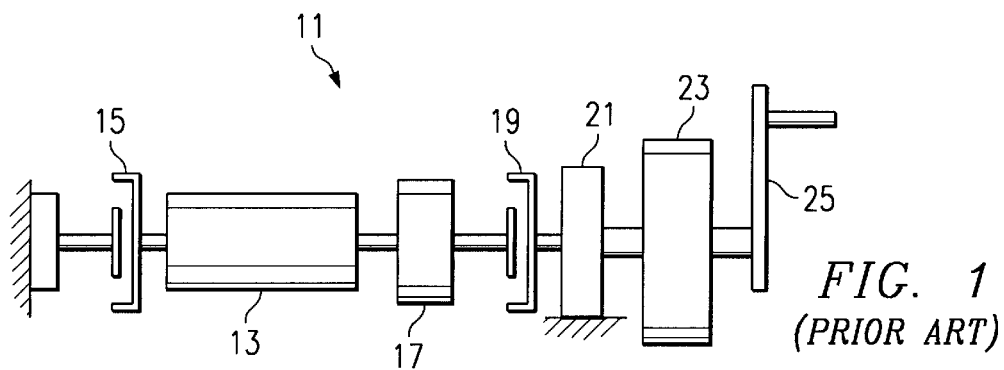
FIG. 1 is a schematic depicting a prior-art actuator for a control system.

Referring to FIG. 1 in the drawings, a schematic of a typical prior-art trim actuator 11 for an aircraft (not shown) is illustrated. Trim actuator 11 includes a motor 13, a brake 15 coupled to motor 13, a first gear train 17 also coupled to motor 13, a clutch 19 coupled to gear train 17, a damper 21 coupled to clutch 19, a second gear train 23 coupled to damper 21, and an output arm 25 coupled to second gear train 23. Motor 13 is typically a small, high-speed servo motor of the AC or DC type. Because servo motors do not typically provide any inherent braking or locking capabilities, it is necessary to couple brake 15 to motor 13 to provide braking and locking capabilities. In these prior-art devices, it is desirable to keep the brake small; therefore, it is necessary to employ a number of gear stages to reduce the torque requirements. First gear train 17 and second gear train 23 provide the necessary gear reductions. This arrangement allows motor 13 to produce the commanded motion of output arm 25. Brake 15 provides a means to lock the output of trim actuator 11. Typically, brake 15 is spring-activated and released by an electromagnet whenever motor 13 is to be driven. The problem with this type of arrangement is that the gearing of first gear train 17 and second gear train 23 magnify the inertia of motor 13 and brake 15 by the numerical square of the gear ratio, such that the inertial forces felt by the operator (not shown) are unacceptable.

The addition of clutch 19 is an attempt to solve this problem of unacceptable inertial forces. Clutch 19, usually an electromagnetic clutch, is typically placed near output arm 25, with the torque from motor 13 reduced somewhat by first gear train 17 and second gear train 23. This allows the inertia of motor 13 and the other components to be isolated by clutch 19, when clutch 19 is deactivated. However, clutch 19 has to be energized in order to brake or hold the output of trim actuator 11. Because clutches and brakes are among the most troublesome mechanical devices, their removal would result in savings in both cost and weight, and the resultant control system would be inherently simpler and more reliable.

Figure 2:
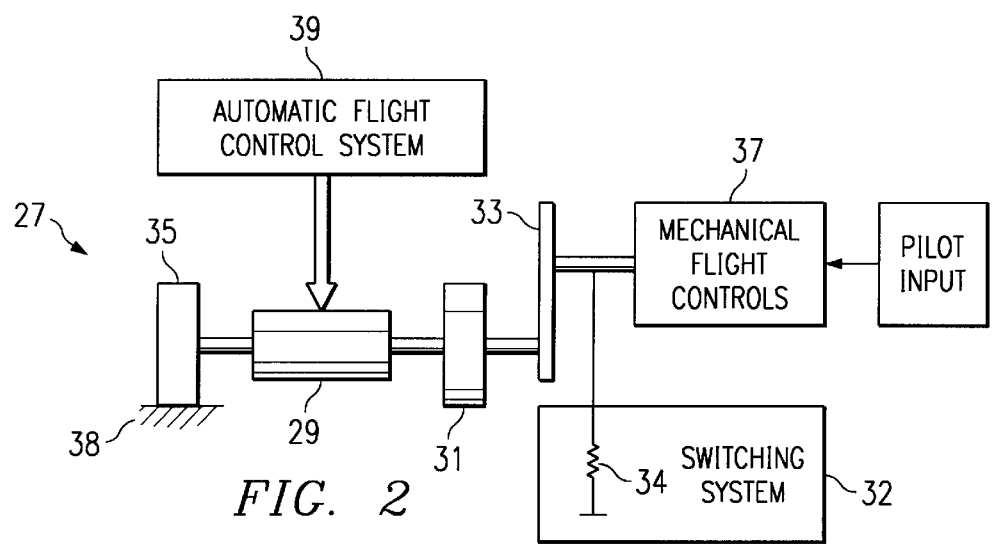
FIG. 2 is a schematic of the trim actuator of the present invention.

Referring now to FIG. 2 in the drawings, a schematic of the preferred embodiment of a trim actuator 27 of the present invention is illustrated. Trim actuator 27 includes a conventional stepper motor 29, a gear train member 31 coupled to stepper motor 29, an output member 33 coupled to gear train member 31, and an optional damping member 35 coupled to stepper motor 29. Trim actuator 27 provides all of the same functionality of the typical prior-art mechanisms illustrated in FIG. 1, using only stepper motor 29, gear train member 31, and output member 33. The key to gaining the same functionality without undesirable features is to take advantage of the different relationship of torque and inertia to the ratio of the gearing 31 between the motor shaft and the actuator output. Whereas the inertia of the actuator, as seen at the output, is dominated by the inertia of the motor 29 and the numerical square of the gear ratio, the torque at the output is determined by the motor torque linearly proportional to the ratio of the gearing 31. Then, by choosing a motor that has a higher available torque than would be dictated by the actuator mechanical power requirements, a lower gear ratio can be used, to the extent the inertia and torque are both adequate. Overall, there is a trade between having more complexity and parts, and choosing a larger motor than would have been selected upon following conventional logic. The size and weight increase to the motor can be more than offset by the elimination of the other complications.

Stepper motor 29, preferably has a multi-phase winding with an associated sequence of excitation. Stepper motor 29 preferably has three or four phases (not shown). Therefore, stepper motor 29 can index, in step-wise fashion, according to the sequence of excitation of its multi-phase windings. The indexing process drives stepper motor 29 by providing a time-sequence of phase excitations according to the speed which is desired, including a zero speed, or holding condition. Stepper motor 29 is easily driven by a conventional digital control system (not shown), which is capable of turning on or off the various phases of stepper motor 29.

Stepper motor 27 can be made to function as a braked, or locked device by exciting one or more phases in a fixed pattern, that is, without a time sequence. Stepper motor 27 is also capable of responding to a time sequence of phase excitations which causes stepper motor 27 to drive at a desired rate in response to signals or commands, providing precise control of the speed. When none of the phases of stepper motor 29 are excited, stepper motor 29 produces no driving torque and can therefore be back-driven in a free-wheeling mode of operation.

In operation, driven output member 33 of trim actuator 27 can move mechanical flight controls 37, such as the pedals or cyclic stick, in response to driving signals from an automatic flight control system 39, such as an autopilot or stability augmentation system. Trim actuator 27 provides a free-wheeling or non-interfering mode in which the mechanical controls are free to be moved by the pilot without interference, such as friction, inertia, or damping, from the control system. Trim actuator 27 provides a braked or locked mode relative to a fixed mechanical reference 37 with respect to one of the mechanical controls, in some cases through a switching system 32 which in helicopters includes a spring cartridge 34. In this manner, trim actuator 27 provides motion with sufficient force, speed and precision. The braking force and precision of trim actuator 27 are adequate to maintain the mechanical controls in a selected fixed position chosen by the pilot. Trim actuator 27 requires no brakes or clutches. The stepper motor holding torque, in combination with the gear ratio, develops a holding-force-versus-deflection that is sufficient to maintain the actuator output position with the precision needed for control system trimming applications Optional damping member 35 provides damping torque to control the free-wheeling and acceleration properties of trim actuator 27 as the holding power is released. If stepper motor 29 is a variable reluctance stepper motor, damping member 35 becomes a necessary component, as variable reluctance stepper motors do not act as generators when mechanically driven.

Alternative embodiments of trim actuator 27 include motors 29 of the following types: (1) a conventional ironless-rotor, permanent-magnet stepper motor; (2) a conventional brushless DC motor, which may contain built-in means to commutate the power to the motor windings, which is defined as a special class of stepper motor; (3) any motors with special provisions to provide the braking function, such as a motor with a shifting rotor or auxiliary holding windings; (4) any motor capable of providing a magnetic holding force, but allowing complete or adequate free-wheeling when de-energized, such as motors having a uniform-ring stator or rotor. An ironless-rotor, permanent-magnet stepper motor would allow free-wheeling, and at the same time provide a means to apply velocity damping by shunting the motor and using it as a loaded generator to provide a damping force, eliminating the need for the optional damper 35.

Figure 3:
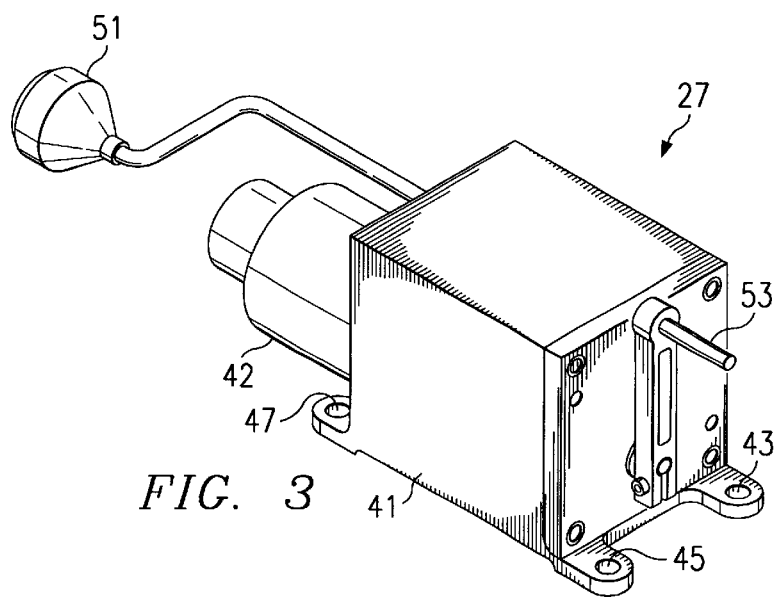
FIG. 3 is a perspective view of the preferred embodiment of the trim actuator of the present invention.

FIG. 3 is a perspective view of trim actuator 27. Trim actuator 27 includes gear housing 41 and motor housing 42. Gear housing 41 includes a plurality of mounting feet 43, 45, 47, 49 (which is not shown in the view of FIG. 3). Connector 51 is provided for providing a mechanical connection to the stepper motor 29 (of FIG. 2) and a damping member 35 (of FIG. 2) which are housed together within motor housing 42.

Figure 4:
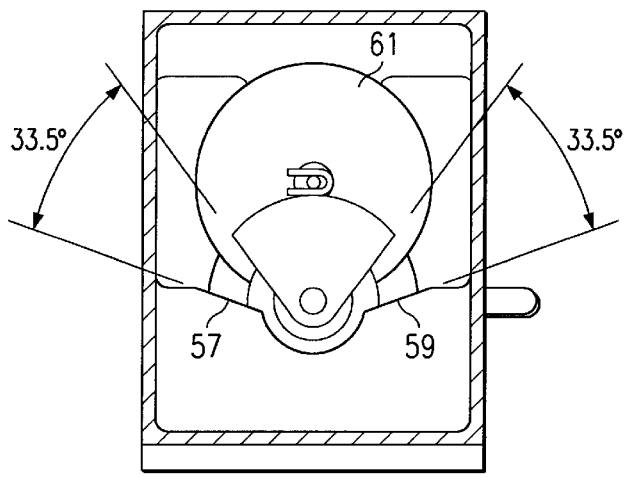
FIG. 4 is a simplified cross section view of the trim actuator of the preferred embodiment of the present invention.
Figures 5, 6:
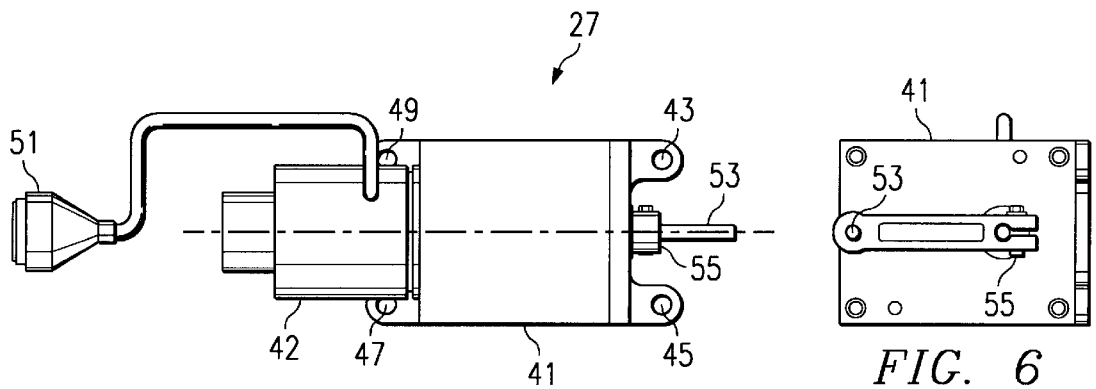
FIG. 5 is a top plan view of the preferred embodiment of the trim actuator of the present invention.
FIG. 6 is a end view of the preferred embodiment of the trim actuator of the present invention.

Output arm 53 extends from housing 41. Output arm 53 is connected to gear train member 31 (of FIG. 2) and is adapted for mechanically coupling to the mechanical flight controls 37 (of FIG. 2). FIG. 5 provides an alternative top view of trim actuator 27 of FIG. 3. All four mounting feet 43, 45, 47, 49 are shown in this view. The physical relationship between connector 51 and motor housing 42 is also shown in this view. In this view, output arm 53 is shown connecting through bolt clamp 55 to the gear train member 31 (of FIG. 2) which is housed within housing 41. FIG. 6 provides an end view of output arm 53. As is shown, it is positioned substantially orthogonal to a shaft which extends out of housing 41. The output arm 53 and the shaft are connected by clamp bolt 55. In the preferred embodiment of the present invention, output arm 53 is limited in its range of motion through a predefined arc of positions, as is depicted in FIG. 4. Preferably, but not necessarily, output arm 53 is connected to a sector gear assembly 61 which is allowed to move between mechanical stops 57, 59 through a predetermined range of motion. In alternative embodiments, the output arm 53 could be allowed to move through a greater or smaller range of motion. As a practical matter, most mechanical flight controls 37 (of FIG. 2) operate over a relatively narrow range of motions.

Figure 7:
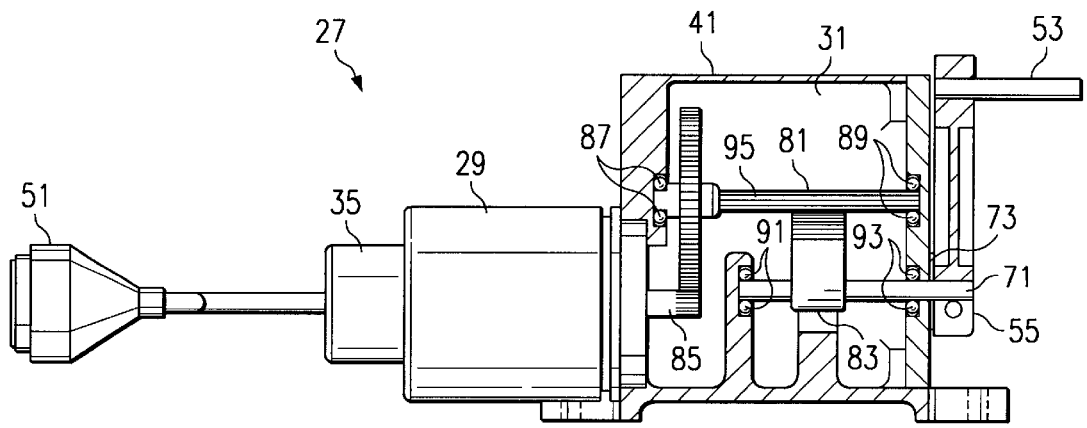
FIG. 7 is a longitudinal section view of the preferred embodiment of the trim actuator of the present invention.

The preferred embodiment for gear train member 31 (of FIG. 2) will now be described with references to FIG. 7. FIG. 7 is a simplified longitudinal section view of the trim actuator 37 which includes a gear train member 31 which represents the preferred embodiment of the present invention.

Referring now to FIG. 7, trim actuator includes stepper motor 29, damping member 35, and gear train member 31. Gear train member 31 is housed within housing 41. A shaft 71 extends from an opening 73 in housing 41. Shaft 71 is fastened by bolt clamp 55 to output arm 53. Gear train member 31 preferably includes a duplex gear shaft 81 which mechanically engages output sector gear 83. Duplex gear shaft 81 is mechanically coupled to rotor pinion shaft 85 which extends from stepper motor 29 into housing 41. Duplex gear shaft 81 is rotatably carried within housing 41 by bearings 87, 89. Duplex gear shaft 81 will rotate in response to rotation of motor pinion shaft 85. Shaft 95 of duplex gear shaft 81 is mechanically rotatably coupled to output sector gear 83. Output sector gear 83 is rotatably carried within housing 41 by bearings 91, 93. Shaft 71 is an integral part of output sector gear 83. It extends outward from housing 41 and is mechanically coupled to output arm 53.

Figure 8:
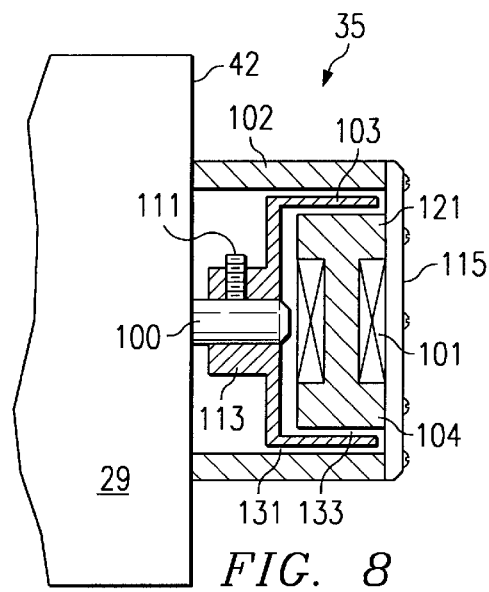
FIG. 8 is a simplified longitudinal section view of the damping member in accordance with the preferred embodiment of the present invention.
Figure 9:
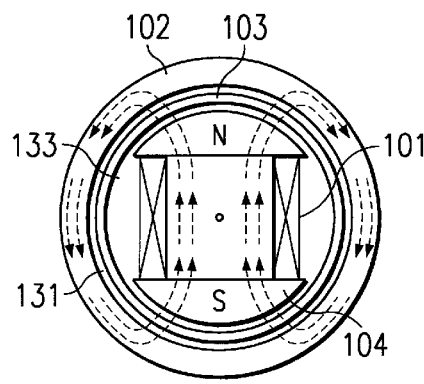
FIG. 9 is a flux circuit drawing of the damping member in accordance with the preferred embodiment of the present invention.
Figure 10:
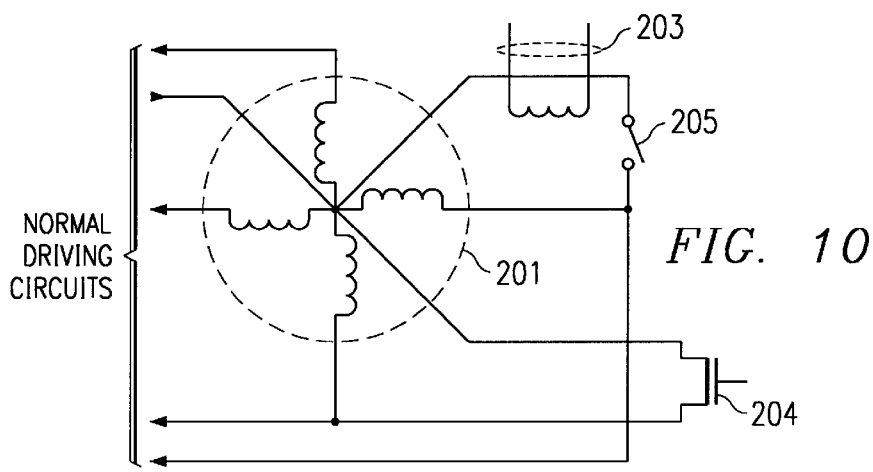
FIG. 10 is a circuit drawing of an alternative damping mechanism which may be utilized in accordance with the present invention.

FIGS. 8, 9, and 10 depict the preferred damping member 35 (of FIG. 2) utilized in the trim actuator 27 (of FIG. 2) of the preferred embodiment of the present invention. FIG. 8 is a simplified longitudinal section view which depicts the operative components of damping member 35. In contrast, FIG. 9 is a simplified cross section view of damping member 35 of FIG. 8, with flux lines shown therein. Beginning with FIG. 8, as is shown, housing 102 comprises a combined housing and a magnetic material (preferably iron) circuit return path for the magnetic flux. It is disposed at the rear end of motor housing 42. Damping member 35 is mechanically coupled to the rear motor shaft 100. Rear motor shaft 100 is at the opposite end of the shaft which has the gear pinion which drives gear train member 31 (of FIG. 2). The damping member 35 is "piggy-backed" onto the stepper motor 29. It is secured within mounting member 113 by mechanical fastener 111. Preferably, mounting member 113 is integrally formed with cup 103 which is preferably a non-magnetic, but conductive, cup. Preferably, the cup is formed from either aluminum or copper. Cup 103 will rotate with rear motor shaft 100. As is conventional, eddy currents are generated in cup 103 by the motion of the conductive material which forms cup 103. The eddy currents are caused by the change of flux due to the rotation of cup 103.

As is shown in FIG. 8, electromagnet 104 is located within cup 103 and secured in position relative to housing 102 by cover 115 which is formed of non-magnetic material. As is shown, cover 115 is secured by screws into housing 102. Electromagnet 104 is secured to cover 115 by screws also. Electromagnet 104 is stationary relative to cup 103. Electromagnet 104 includes a magnetically permeable core 121 and windings 102 located in a winding cavity formed within core 121. As is also shown in FIG. 8, air gaps 131, 133 are between housing 102, cup 103 and electromagnet 104. In other words, none of these pieces physically touch one another. As alternating current is passed through windings 101 of electromagnet 104, magnetic flux is generated. Eddy currents are generated in cup 103 by the change of flux due to the rotation of the cup 103. The magnitude of the eddy currents is proportional to the rate of change of flux, which is set by the angular velocity of the motor shaft 100 and cup 103. FIG. 9 is a simplified magnetic circuit which shows the magnetizing force produced by coil 101 of electromagnet 104. As is shown, lines of flux pass through air gaps 131, 133 and cup 103. As is shown, the magnetizing force produced by coil 101 produces flux through the walls of the cup and areas adjacent to the poles of the electromagnet 104. In the view of FIG. 9, the North and South polarities are depicted, as are the lines of flux. The flux has components which are 90° relative to the motion of the conductive material, thus meeting one of the requirements for the generation of eddy currents. The flux magnitude changes as the elements of the conductive cup 103 move through the fields at the poles, first in one direction, and through the zero crossing, and then the other direction, thus meeting the other requirement for the generation of eddy currents.

While FIGS. 8 and 9 depict a two-pole arrangement, it is possible for alternative embodiments to provide more poles (such as four poles), depending upon the physical constraints which are required to make the damping member compact and efficient. Additionally, while FIGS. 8 and 9 depict a housing 102 which combines the functions of a housing with that of a magnetic flux circuit pathway, it is possible in alternative embodiments to provide a separation of these functions, so that a magnetic material in the form of a ring is carried by the housing, thus confining the flux pathways to the magnetic material.

In accordance with the preferred embodiment of the present invention, the damping member 35 is under the control of the automatic flight control system 39 (of FIG. 2). The automatic flight control system 39 operates to provide an alternating current to damping member 35 for a brief interval (1 or 2 seconds) at the transition between an automatic flight control mode of operation and a manual flight control mode of operation. The damping member 35 operates to counteract the oscillatory and dynamic forces associated with switching system 32 (of FIG. 2), and especially associated with the spring component 34 (of FIG. 2) within the switching system 32. Thus, in accordance with the preferred embodiment of the present invention, during all other intervals of operation, the damping member 35 is not actuated. In alternative embodiments, the damping member 35 (of FIG. 2) may be utilized to supply a preselected amount of damping to the rotor of stepper motor 29 (of FIG. 2). The relationship between the excitation current and the damping effect is essentially linear, and provides very good proportionate control. Accordingly, the automatic flight control system 39 can utilize the damping system during completely or partially automated modes of operation to supply a predetermined (and variable, across the linear range of the relationship) amount of damping which may be desired by the pilot or necessary for particular flight situations.

Additionally, in alternative embodiments it may be possible to utilize motors which have permanent magnetic fields. In that case, a separate eddy current damping mechanism could be eliminated, and the damping could be obtained utilizing the naturally-generated electromotive force (emf) from the motor windings. FIG. 10 depicts how this could be accomplished. Motor 201 is depicted in electrical schematic form as including a number of cooperating motor windings. One of more of the windings can be connected to a variable resistance loading circuit 203 which may be switched into, and out of, the circuit utilizing relay 205. The loading circuit could consist of a transistor (such as a field effect transistor) which can provide a variable resistance when the gate-to-source voltage is changed. Alternatively, the motor winding resistance could be used to maximize the damping by shorting across one or more motor windings using solid-state transistors or silicone control rectifiers, switches, or relay contacts. Both of these alternatives are depicted in FIG. 10.

Figure 11:
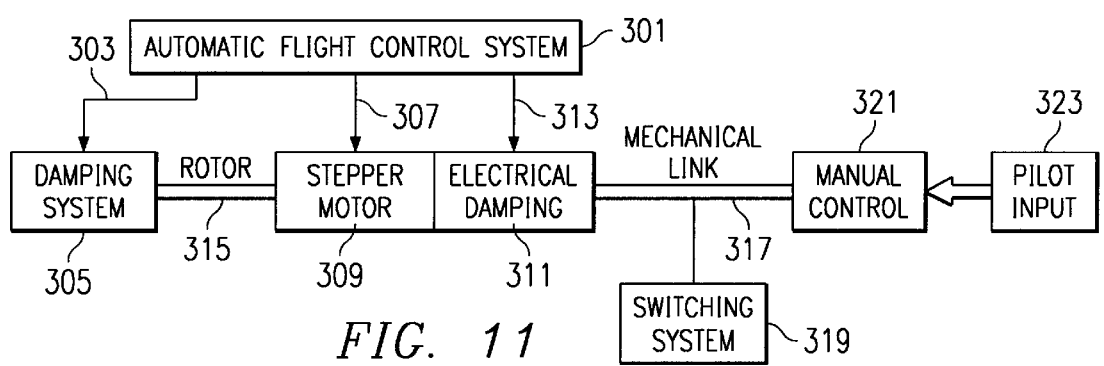
FIG. 11 is a block diagram respresentation of an alternative embodiment which can be utilzied to obtain complex control.

FIG. 11 is a flowchart representation of an alternative embodiment of the present invention in which the automatic flight control system 301 is utilized to provide more complex control over the manual controls 321 of an aircraft. In this particular embodiment, current is supplied over current pathway 303 by automatic flight control system 301 to an eddy current damping system 305. As is discussed above, the eddy current damping system 305 acts upon one end of the rotor 315 of stepper motor 309. Automatic flight control system 301 also controls stepper motor 309 by supplying current through current pathways 307 to the multiple windings of the stepper motor. Additionally, automatic flight control system 301 supplies command signals through command line 313 to electrical damping system 311 which is a control circuit which introduces a preselected amount of damping (through a change in impedance) upon receipt of a control signal. This type of system is discussed and depicted in FIG. 10 and may comprise an analog or digital circuit which alters the impedance of one or more windings of one or more coils of the stepper motor in order to obtain a predetermined amount of damping. As is shown, mechanical linkage 317 is coupled to stepper motor 309 as well as switching system 319. The switching system allows the switching between automated, semi-automated, and manual modes of operation. Mechanical link 317 communicates with manual control 321 which is a manual control system for controlling flight. Manual control system 321 receives pilot input 323 during manual and semiautomatic modes of operation. In this particular embodiment, automatic flight control system 301 may be utilized to switch the trim actuator between (1) a free-wheeling mode of operation, wherein manual control is allowed, in which the trim actuator provides little or no impact on the manual control, (2) automated or semi-automated modes of operation or in the trim actuator, and other trim actuators, provide a predetermined amount of automatic control of the flight; and (3) a transition mode of operation, wherein the aircraft is switched between automatic or semiautomatic modes of operation and manual modes of operation. During the transition mode of operation, the eddy current damping system 305 and/or the electrical damping system 311 are utilized to abate the vibration and oscillation induced by switching, and in particular, the vibration and oscillation induced by switching system 319 during the transition. During the semi-automated or automated modes of operation, eddy current damping system 305 and/or electrical damping system 311 may be utilized to provide a predetermined (and programmable) amount of dampening on the mechanical control system 321.

The following is a discussion of the stepper motor utilized in the preferred embodiment of the present invention. Preferably, the stepper motor is a four phase motor. The maximum step rate for the motor is one hundred and sixty steps per second. In the preferred embodiment, the nominal step size for the output arm is 0.1°. Preferably, the no-load performance criteria for the stepper motor is that, with no operating load and at rated input voltage, the stepping motor shall drive the actuator to a no-load output speed of 1.0 revolutions per minute, without losing steps or ramping the step rate. In the preferred embodiment, the normal load performance for the stepper motor is, with normal static operating load of 15 inch—pounds and at rated input voltage, that the stepping motor shall drive the actuator to an output speed of 0.6 revolutions per minute, without losing steps or ramping the step rate. In the preferred embodiment, the stepper motor shall be supplied with 28 volts dc aircraft power. The stepper motor should operate in a locked mode of operation with 28 volts dc applied continuously to one or more phases of the stepping motor. Preferably, the stepping motor should operate to hold the actuator output arm against the maximum stall-torque, static-load of 100 inch—pounds. Preferably, the trim actuator should have an inertia of 25 ounce-inch-(seconds)$^2$. In the preferred embodiment, the stepper motor shall draw a current not to exceed two amperes.

In the preferred embodiment of the present invention, the eddy current damper shall be electrically driven by 28 volts dc. The current drawn by the eddy current damper shall not exceed 2.0 amperes. In accordance with the preferred embodiment, with the damper energized with 28 volts dc (plus or minus one volt) the torque required to back-drive the output arm shall be 20 inch—pounds minimum for any output arm position (not against a travel-limiting stop) and for output arm speeds of 60° per second. The torque required to back-drive the output arm shall not exceed 2 inch—pounds for any output arm position that is not against a travel limiting stock and for an output arm speed of 0–60° per second. Preferably, the eddy current damper duty cycle shall be 20% of the time (periods of two seconds "on" and eight seconds "off").

It should be apparent from the foregoing that an invention having significant advantages has been provided. While the invention is shown in only one of its forms, it is not just limited but is susceptible to various changes and modifications without departing from the spirit thereof.

I claim:

1. A trim actuator for actuating mechanical controls in an aircraft flight control system in response to signals from a pilot, the trim actuator comprising:
   a stepper motor;
   a gear train member coupled to the stepper motor;
   an output member coupled to the gear train member;
   wherein said trim actuator is operable in a plurality of modes by operator including:
   a) a locked mode in which the mechanical controls are held in a fixed position relative to the aircraft;
   b) a non-interference mode in which the mechanical controls are free to be moved by the pilot without interference from the aircraft flight control system; and
   wherein the non-interference mode and the locked mode both being achieved by the stepper motor.

2. The trim actuator according to claim 1, wherein the stepper motor is an ironless-rotor, permanent-magnet stepper motor that provides damping.

3. The trim actuator according to claim 1, wherein the stepper motor is replaced by a brushless DC motor containing built-in means to commutate the power to motor windings.

4. The trim actuator according to claim 1, wherein the stepper motor is replaced by a motor with a shifting rotor.

5. The trim actuator according to claim 1, wherein the stepper motor is replaced by a motor with auxiliary holding windings.

6. The trim actuator according to claim 1, wherein the stepper motor is replaced by a motor having a uniform-ring stator or rotor.

7. The trim actuator according to claim 1, further comprising:
   a torque damping member coupled to the stepper motor.

8. A method of actuating mechanical controls in an aircraft flight control system, the method comprising the steps of:
   providing a stepper motor;
   coupling a gear train member to the stepper motor;
   coupling an output member to the gear train member;
   utilizing the stepper motor to generate a locked mode in which the mechanical controls are held in a fixed position relative to the aircraft; and
   utilizing the stepper motor to generate a non-interference mode in which the mechanical controls are free to be moved by the pilot without interference from the aircraft flight control system.

9. The method according to claim 8, wherein the stepper motor is an ironless-rotor, permanent-magnet stepper motor that provides damping.

10. The method according to claim 8, wherein the stepper motor is replaced by a brushless DC motor containing built-in means to commutate the power to motor windings.

11. The method according to claim 8, wherein the stepper motor is replaced by a motor with a shifting rotor.

12. The method according to claim 8, wherein the stepper motor is replaced by a motor with auxiliary holding windings.

13. The method according to claim 8, wherein the stepper motor is replaced by a motor having a uniform-ring stator or rotor.

14. The method according to claim 8, further comprising the step of:
   providing a torque damping member coupled to the stepper motor.

* * * * *

UNITED STATES PATENT AND TRADEMARK OFFICE
CERTIFICATE OF CORRECTION

PATENT NO. : 6,325,331 B1
DATED : December 4, 2001
INVENTOR(S) : McKeown, William L.

It is certified that error appears in the above-identified patent and that said Letters Patent is hereby corrected as shown below:

Column 10,
Please insert the following section and statement immediately following the claim:

-- Government License Rights
The U.S. Government has a paid-up license in this invention and the right in limited circumstances to require the patent owner to license others on reasonable terms as provided for by the terms of Contract No. N00019-96-C-0128 awarded by NAVAIR. --

Signed and Sealed this

Sixteenth Day of December, 2003

JAMES E. ROGAN
*Director of the United States Patent and Trademark Office*